United States Patent [19]
Rosborough

[11] 3,981,515
[45] Sept. 21, 1976

[54] MOVABLE STEP OF A VEHICLE
[75] Inventor: Dean E. Rosborough, Blue Mound, Ill.
[73] Assignee: Caterpillar Tractor Co., Peoria, Ill.
[22] Filed: Sept. 22, 1975
[21] Appl. No.: 615,260

[52] U.S. Cl. .............................. 280/166; 182/91; 105/443
[51] Int. Cl.² ........................................ B60R 3/02
[58] Field of Search ..................... 280/166; 182/91; 105/443, 447

[56] References Cited
UNITED STATES PATENTS
| | | |
|---|---|---|
| 2,678,832 | 5/1954 | Wright .............................. 182/91 X |
| 3,854,752 | 12/1974 | Flint et al. ........................ 280/166 |
| 3,912,299 | 10/1975 | Carr ................................... 280/166 |

Primary Examiner—M. H. Wood, Jr.
Assistant Examiner—Michael J. Forman
Attorney, Agent, or Firm—Frank L. Hart

[57] ABSTRACT

A vehicle has a step that is vertically movable for protecting the step against damage. Pivot means and restraining means of the step are positioned for avoiding damage.

4 Claims, 4 Drawing Figures

U.S. Patent  Sept. 21, 1976  3,981,515
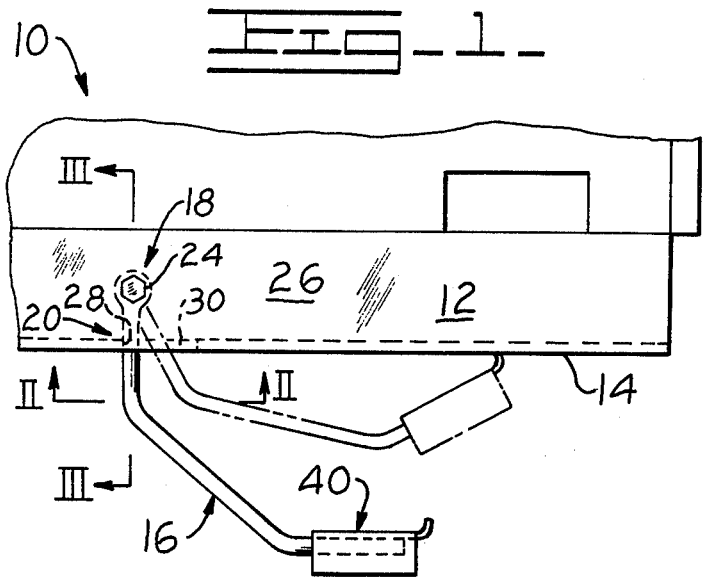
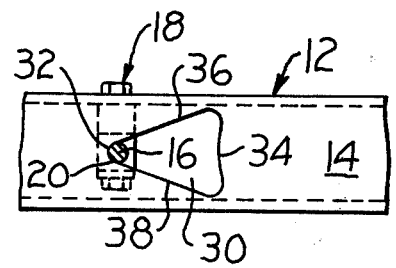
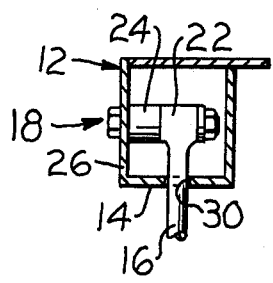
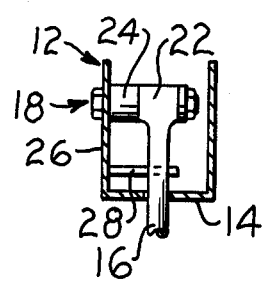

MOVABLE STEP OF A VEHICLE

BACKGROUND OF THE INVENTION

In vehicles of the earthmoving type, the operator's platform may be at such a height that a step or ladder member is needed to gain access. The step may be located in an area susceptible to damage by the contact of obstructions therewith as the vehicle is driven and should be capable of withstanding such contact and remaining in a properly operable condition.

A pivotal step was developed and is shown in U.S. Pat. No. 3,854,752 which issued Dec. 17, 1974 to W. H. Flint et al from an application filed Aug. 23, 1973. Although this pivotal step was a marked improvement over heretofore utilized steps, it was discovered that the step assembly could sometimes be damaged by an object impacting the pivotal connection on the restraining means of the step.

SUMMARY OF THE INVENTION

This invention therefore resides in a pivotal step which is constructed for protecting the pivotal connection and restraining means from impact.

BRIEF DESCRIPTION OF THE DRAWINGS

FIG. 1 is a diagrammatic side view of a portion of a vehicle having the step of this invention;

FIG. 2 is a diagrammatic view taken along line II—II of FIG. 1;

FIG. 3 is a diagrammatic view taken along line III—III of FIG. 1; and

FIG. 4 is a diagrammatic view of another embodiment of the step element.

DETAILED DESCRIPTION OF THE INVENTION

Referring to FIGS. 1–3, a vehicle 10 has a frame portion 12 having a lower edge 14 and a step member 16 pivotally connected to the frame portion 12 for generally upward and downward movement of the step member 16 relative to the frame portion 12.

Means 18 is provided for pivotally connecting the step member 16 to the frame 12 at a location adjacent and spaced upwardly from the lower edge of the frame 12. A restraining means 20 is provided for restraining the step member 16 against pivotal movement below a preselected elevation. The restraining means 20 is positioned at an elevation greater than the lower edge surface of the frame 12.

The pivotal connecting means 18 (as better seen in FIG. 3) comprises a sleeve 22 connected to an end of the step member 16 and a pivot pin 24 passing through the sleeve 22 and being connected to the wall 26 of the frame 12. The restraining means 20 has a stop 28 positioned above the lower edge surface of the frame 12. The stop 28 is positioned at a preselected location relative to the pivot means 18.

In the preferred embodiment, the stop 28 is an edge portion of the frame 12 that is formed by an opening 30 extending through the frame 12. In the installed position, the step member 16 extends from beneath the frame 12, through the opening 30 and to pivot means 18.

Referring to FIG. 2, the preferred stop 28 extends from a first end 32, immediately adjacent the stop 28, along the frame 12 to a second end 34 of the opening 30. The second end 34 of the opening 30 preferably is greater than the first end 32 as measured transverse the elongated frame 12. By this construction, angular impact against the step does not damage the step 16 for the increasing width of the opening 30 permits limited lateral movement of the step member 16. Further, the angular sides 36,38 of the opening 30 function to guide the step 16 to the first end 32 during movement of the step from the second end 34 toward the first end 32. The sleeve 22 can also have a width sufficient for permitting limited movement of the sleeve 22 along pin 24. Lateral movement can also be provided by mounting the step 16 to the frame 12 via a bearing.

The step member 16 has a step portion 40 for receiving the foot of an operator. The step member 16 is pivotally movable and of a configuration sufficient for movement of the step portion 40 between a first position, shown by broken lines, at which the step portion 40 is adjacent the frame portion and angularly positioned relative to the horizontal and a second position, shown by solid lines, at which the step portion 40 is spaced a preselected distance from the frame portion 12 and is oriented generally horizontally. At the second position the step member 16 is in contact with and being maintained by the stop 28. The step member 16 is movable by gravity from the first to the second position.

Referring to FIG. 4, the stop element 28 can be a protrusion extending from a wall 26 of the frame 12 adjacent the opening 30.

Other aspects, objects, and advantages of this invention can be obtained from a study of the disclosure and appended claims.

What is claimed is:

1. In a vehicle having a frame portion having a lower edge surface and a step member pivotally connected to the frame portion for generally upward and downward movement of the step member relative to the frame portion, the improvement comprising:

means pivotally connecting the step member to the frame at a location adjacent and spaced upwardly from the lower edge surface of said frame portion; and a stop positioned at about the lower edge portion of the frame at an elevation greater than the lower edge surface of said frame portion and at a preselected location relative to the pivotally connecting means for restraining the step member against pivotal movement below a preselected elevation, said stop being an edge portion of a frame opening extending through the frame with the step member extending through said opening, said opening extending from a first end immediately adjacent the step along the frame to a second end of the opening with said second opening end being greater than said first opening end as measured transverse the frame.

2. Apparatus, as set forth in claim 1, wherein the pivotally connecting means comprises:

a sleeve connected to an end of the step member; and
   a pivot pin passing through the sleeve and being connected to a wall of the frame.

3. Apparatus, as set forth in claim 1, wherein the step member has a step portion for receiving the foot of an operator, said step member being pivotally movable and of a configuration sufficient for movement of the step portion between a first position at which the step portion is adjacent the frame portion and angularly positioned relative to the horizontal and a second position at which the step portion is spaced a preselected distance from the frame portion and is oriented generally horizontally.

4. Apparatus, as set forth in claim 1, wherein the step member is a rod pivotally connected at one end to the frame portion and having the step portion formed on the opposed end thereof.

* * * * *